United States Patent [19]
Kuehl et al.

[11] Patent Number: 5,138,559
[45] Date of Patent: Aug. 11, 1992

[54] SYSTEM AND METHOD FOR MEASURING LIQUID MASS QUANTITY

[75] Inventors: Johannes W. Kuehl, Edmonds; Jason W. Capps, Bellevue, both of Wash.

[73] Assignee: The Boeing Company, Seattle, Wash.

[21] Appl. No.: 399,601

[22] Filed: Aug. 28, 1989

[51] Int. Cl.$^5$ .................. G01F 23/00; G08B 21/00
[52] U.S. Cl. .................. 364/509; 364/558; 73/49.2 T; 73/292; 340/618
[58] Field of Search ............ 364/509, 557, 558, 463, 364/424.06; 73/291, 292, 295, 301, 49.2 T, 861.01, 861.02, 861.03, 861.42; 340/612, , 618, 622

[56] References Cited

U.S. PATENT DOCUMENTS

| | | | |
|---|---|---|---|
| 3,653,262 | 4/1972 | Ehrenfried et al. | 73/301 X |
| 3,948,096 | 4/1976 | Miller | 73/178 R |
| 4,258,422 | 3/1981 | Dougherty et al. | 364/442 |
| 4,420,976 | 12/1983 | Orloff et al. | 73/291 X |
| 4,425,795 | 1/1984 | Albrecht et al. | 364/509 |
| 4,451,894 | 5/1984 | Dougherty et al. | 364/509 |
| 4,471,656 | 9/1984 | Sanders et al. | 73/438 |
| 4,502,124 | 2/1985 | Grohmann et al. | 364/442 |
| 4,545,020 | 10/1985 | Brasfield | 364/509 |
| 4,553,216 | 11/1985 | Stevens et al. | 364/558 |
| 4,739,494 | 4/1988 | Torii | 364/558 |
| 4,748,846 | 6/1988 | Haynes | 73/291 X |
| 4,852,054 | 7/1989 | Mastandrea | 73/49.2 T X |
| 4,872,120 | 10/1989 | Orloff et al. | 364/509 |
| 4,908,776 | 3/1990 | Crill et al. | 364/509 |
| 4,915,507 | 4/1990 | Janotta | 73/295 X |
| 4,918,619 | 4/1990 | Orloff et al. | 364/509 |
| 4,954,973 | 9/1990 | Jacob et al. | 364/509 X |
| 4,958,290 | 9/1990 | Kendall et al. | 364/463 |

Primary Examiner—Joseph L. Dixon
Attorney, Agent, or Firm—Christensen, O'Connor, Johnson & Kindness

[57] ABSTRACT

A method and system for measuring the mass quantity and volume of fuel in an aircraft fuel tank is disclosed. A pressure assembly (124) is disposed proximate the lowest portion of each fuel tank on an aircraft (60), with respect to a wing tank (100). The pressure sensor assembly includes a temperature probe (126) having a plurality of temperature sensors (128) mounted therein at spaced apart elevations within the fuel tank. Also included is an attitude sensor (150) in which are provided a roll sensor (156) and a pitch sensor (160) for respectively determining the roll and pitch angles of the fuel surface with respect to a vertical reference axis on the aircraft. The reference axis is aligned with an acceleration-sensitive axis of an accelerometer (164), which is operative to determine the acceleration acting upon fuel within the wing tank, and using the roll and pitch angles, the acceleration normal to the upper surface of the fuel. Wing bending sensors (82) are installed in each wing to determine the deflection of the wing as a result of loading the wing tanks with fuel and as a result of in-flight aerodynamic forces on the wing. The signals from each of these sensors are input to a microprocessor (178), which determines the height of fuel in each tank, corrects for variations in density due to temperature stratification, determines the volume and mass of fuel as a function of fuel height, correcting for the attitude of the fuel tank and for acceleration applied to the mass of fuel during measurement of its pressure at the bottom of each fuel tank.

26 Claims, 6 Drawing Sheets

once

SYSTEM AND METHOD FOR MEASURING LIQUID MASS QUANTITY

TECHNICAL FIELD

This invention generally pertains to a system for measuring the quantity of liquid within a container, and more specifically, to a system and method for measuring liquid quantity as a function of pressure at the bottom of the container.

BACKGROUND OF THE INVENTION

For obvious reasons, it is essential for an aircraft flight crew to accurately know the quantity of fuel remaining in the fuel tanks of its aircraft at all times, but particularly near the end of a flight when the amount of fuel remaining may effect critical decisions. In addition, the cost of carrying large amounts of unnecessary fuel is high and reduces the amount of transportable cargo. Most large commercial aircraft have a plurality of fuel tanks, with the majority of the fuel being carried in wing tanks, so that its mass is concentrated at the center of lift. Typically, each tank on the aircraft includes a capacitance fuel quantity measurement system that drives a cockpit display indicating the mass of fuel remaining in the tank.

Determination of the quantity of fuel in a tank by a capacitance fuel quantity measurement system is a function of the dielectric constant of the fuel, which in turn depends on the temperature and density of the fuel mixture. A capacitance fuel quantity measurement system includes a plurality of capacitance probes, which are usually mounted in the bottom of each tank, along with a dielectric constant compensator that is used to measure the dielectric constant of the fuel. Since the compensator is also disposed at the bottom of the tank, it measures the dielectric constant of the highest density fuel instead of determining that parameter for the average density of fuel in the tank. In addition, water in the fuel is found in higher concentration in the bottom layer of fuel, where its effect on the compensation of the dielectric constant is greatest. The combined error from these two factors may range from two percent to four percent. Contamination caused by fungus or dirt adhering to the capacitance probes and the effect of contamination on the measurement of the dielectric constant by the dielectric compensator may introduce an additional one to two percent error.

Since the density of the fuel impacts the fuel mass measurement, significant temperature gradients between the top and bottom layers of fuel can produce up to a five percent error in the measurement. No provision is made in existing systems for measuring the temperature at different elevations in each tank to compensate for the varying density distribution caused by temperature stratification.

Capacitance probes and compensators are normally sealed inside each tank, making maintenance more difficult because the electrical wiring and probes are in the wetted fuel tank volume and can only be removed after the tank is drained. Rework and calibration of the capacitive system may require up to three days of airplane out-of-service time.

In attempting to overcome the accuracy and maintenance problems associated with the conventional capacitance fuel measurement system, a method and apparatus for determining the density, volume, and mass of fuel in an aircraft fuel tank as a function of pressure has been developed, as disclosed in U.S. Pat. No. 4,553,216. In this system, four pressure sensors are mounted in an array at unequal depths below the surface of the fuel in a tank. The four pressure signals produced by the transducers are processed by a microcomputer to determine the fuel density and the orientation of the fuel surface with respect to its distance from each sensor. Given the orientation of the fuel surface (and the known dimensional characteristics of the tank), the volume and mass of fuel in the tank may be computed. Alternatively, if the fuel density is either known or otherwise measured, the volume and mass of fuel may be determined using only three pressure sensors.

The approach used in the referenced patent to determine fuel density volume and/or mass as a function of pressure overcomes some of the problems of the more typical capacitance measurement system; however, it does not compensate for varying density of the fuel due to temperature gradients or for variation in the pressure caused by acceleration in a direction normal to the surface of the fuel. Any change in direction or velocity of an aircraft from level flight can produce an acceleration having a component normal to the fuel surface that will affect the measurement of pressure. Failure to compensate for such acceleration can produce significant, instantaneous errors that require substantial time to average out if time filtering is used.

A further problem with the prior art pressure sensor system for measuring fuel quantity results from the disposition of the pressure sensor array in the tank. To ensure that the pressure sensors are submerged as fuel is consumed, they must be mounted at the lowest point in the tank. However, during certain aircraft maneuvers when the fuel level is low, the pressure sensor array may not be submerged. For example, as a plane accelerates or climbs, the resulting acceleration may cause the fuel in a wing tank to flow toward the wing trailing edge and tip, leaving the pressure sensor array exposed. Furthermore, the computation of fuel volume and mass remaining in the tank as a function of pressure is affected by the changes in tank shape that occur due to wing flexure while the aircraft is in flight; yet, there is no provision in the above-noted prior art patent to compensate for this variable.

SUMMARY OF THE INVENTION

The present invention provides for the determination of fuel quantity as a function of pressure and unlike the prior art, compensates for dynamic forces that affect this determination. Accordingly, a system for determining the quantity of liquid in a container, as exemplified by a preferred embodiment of the present invention, includes a pressure sensor disposed proximate a lower portion of the container, which produces a signal indicative of the pressure of the liquid at that point. A plurality of temperature sensors are disposed at different elevations within the liquid, and each produces a signal indicative of the temperature of the liquid at that elevation. Processing means are connected to receive the signals produced by the pressure sensor and temperature sensors to determine a density profile of the liquid and the height of the liquid in the container. The density profile defines the liquid density at different elevations in the container, with respect to a reference density and the temperatures measured by the temperature sensors. The processing means determine the height of the liquid in the container as a function of the density profile and the pressure, and use the height in connection with parameters modeling the shape of the container to determine the quantity of liquid in the container.

The quantity is determined both in terms of its volume and its mass. Accelerometer means are provided for determining a component of an acceleration to which the liquid is subjected, where the component is aligned with a reference axis. The processor means then compensate the signal produced by the pressure sensor in determining the liquid height. Included in the accelerometer means are inclinometer means for determining the angle between the acceleration to which the liquid is subjected and the reference axis so that the orientation of the liquid surface is defined with respect to the reference axis.

In the preferred embodiment, the container is an aircraft wing fuel tank, and the liquid comprises fuel used by the aircraft. During flight, the aircraft wing tank is subject to varying forces that cause the wing to deflect, changing the shape of the tank and height of the fuel in the tank. Accordingly, the system further includes means for sensing a deflection of the aircraft wing fuel tank and producing a signal indicative of such deflection. The processor means are then operative to compensate the determination of fuel height for the deflection of the aircraft wing in response to this signal.

In modeling the shape of the container to determine the volume and mass of liquid, a set of polynomial coefficients are used that define the volume-height relationship of a plurality of parallel sections taken through the container. Clearly, if the container is other than a simple geometric shape such as a cylinder, its volume-height relationship is not trivial. Summation of successive layers having a volume defined by the coefficients for each incremental increase in height enables the volume of liquid in an irregularly shaped container to be determined as a function of the liquid height. The mass for each of those layers is then calculated and integrated to determine the total mass of liquid.

BRIEF DESCRIPTION OF THE DRAWINGS

FIG. 4 schematically illustrates an aircraft wing fuel tank in a phantom view disclosing the internal components of the tank;

DESCRIPTION OF THE PREFERRED EMBODIMENT

The technique for measuring the quantity of a liquid contained in a tank as a function of pressure is most readily understood with respect to a simple cylindrical tank. The liquid surface is assumed to be parallel to the bottom of the tank, such that the pressure ($P_L$) created by the liquid head on a pressure transducer disposed at the bottom of the tank can be expressed by the following equation:

$$P_L = H_L \times D_L \times g \qquad (1)$$

where:
$H_L$ = liquid height
$D_L$ = liquid density; and
g = gravitational acceleration.

Using the results of the pressure measurement and assuming that the liquid density is either known or measured, the liquid height ($H_L$) can be determined by:

$$H_L = P_L/(D_L \times g) \qquad (2)$$

Figure 2:
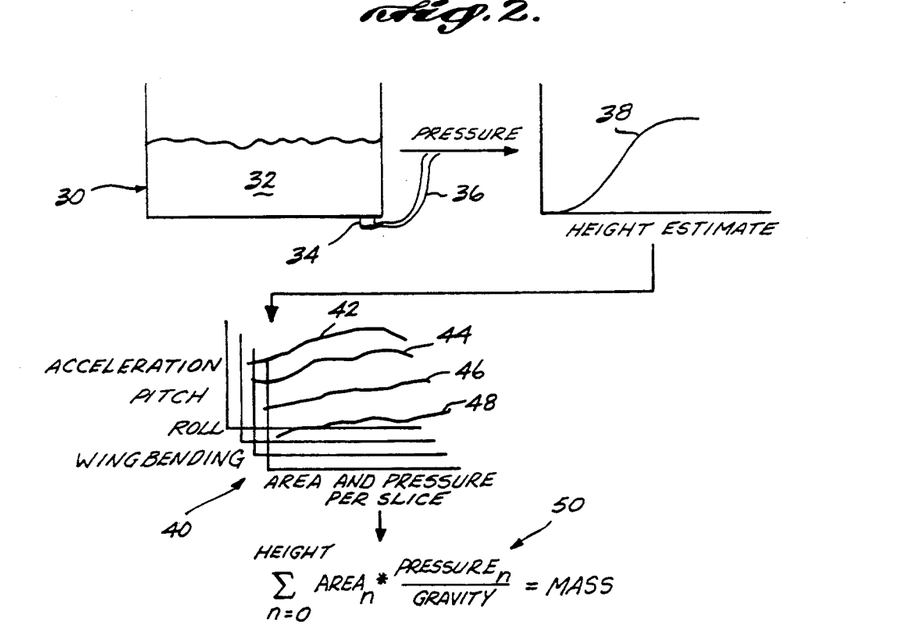
FIG. 2 is a diagram illustrating the corrections applied to an estimated height of liquid in a container to determine the mass of liquid.

Equation 2 is represented graphically in the upper portion of FIG. 2. As shown therein, a cylindrical tank 30 is partially filled with a liquid 32. A pressure transducer 34 is disposed at the bottom of cylindrical tank 30 and is operative to sense the pressure caused by liquid 32 contained within the tank, producing a signal indicative of liquid head pressure, which is output over leads 36.

The relationship between fuel height and pressure is graphically shown by curve 38 in FIG. 2. Once the height of liquid 32 in cylindrical tank 30 is known, the volume of fuel is readily determined as the product of the cross-sectional area of cylindrical tank 30 and the liquid height ($H_L$). Similarly, assuming that its density is uniform, the total mass of liquid 32 within cylindrical tank 30 is simply equal to the product of the volume and the liquid density ($D_F$), as shown in Equation (5). A value for $D_F$ is readily determined by measuring the differential pressure created by the weight of the liquid over a reference height ($H_{REF}$). The differential pressure ($P_D$) can be expressed by:

$$P_D = H_{REF} \times D_F \times g \qquad (3)$$

Thus, density is calculated by:

$$D_F = P_D/(H_{REF} \times g) \qquad (4)$$

Measurement of density ($D_F$) through the use of Equation (4) combined with measurement of fuel pressure and use of the cross-sectional area of the tank permits direct and self-compensating measurement of fuel mass, as developed in equations (5) and (6), below:

$$M_F = D_F * V_F = (P_L/(g*H_L)) * H_L * A \qquad (5)$$

$$M_F = \frac{P_L}{g} * A \qquad (6)$$

where:
$M_F$ = the mass of fluid;
$V_F$ = the volume of fluid;
$H_L$ = the height of the fluid;

$P_L$ = the pressure of the fluid at the bottom of the container; and

A = cross-sectional area of container.

Unfortunately, determining the mass of liquid as a function of pressure in the simplistic cylindrical tank discussed above ignores the multitude of real world problems associated with determining the quantity of fuel in an aircraft fuel tank. However, equation (6) provides a basis for accurately determining fuel mass, taking into account the irregular cross section of the container (fuel tank) and variable acceleration to which the fuel is subject in flight. From equation (6), it should be apparent that the accuracy with which the mass of fluid is measured is independent of the density estimate, type of fluid, dielectric constant, and the nature of any contaminant contained in the fuel. In contrast to cylindrical tank 30, the typical aircraft fuel tank is irregular in shape; the surface of the fuel contained therein is usually not parallel to the lower surface of the tank; the acceleration acting upon the mass of fuel in the tank is not constant; the temperature and therefore the density of the fuel may vary significantly from the bottom of the tank to the upper surface of the fuel; and the orientation of the tank and of the liquid surface in the tank is subject to change as a result of forces acting upon the tank and the liquid during flight. As graphically illustrated in FIG. 2, height estimate curve 38 is but one of a plurality of parameters affecting the determination of fuel quantity in an aircraft fuel tank. Also to be considered are the components of acceleration acting in a direction that is normal to the surface of the fuel, represented by curve 42; the pitch and roll of the aircraft, represented respectively by curves 44 and 46; and the deflection of the wing or wing bending angle, represented by curve 48. Each of these parameters is graphically illustrated, as indicated generally at reference numeral 40, with respect to their impact on the area of a layer of fuel within a wing tank and the pressure contributed by that layer (or "slice").

Figure 1:
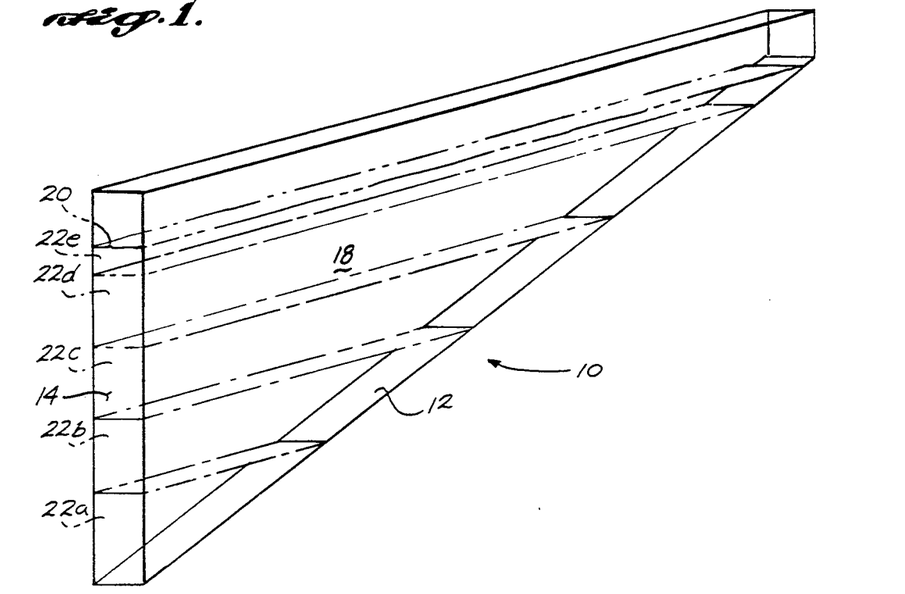
FIG. 1 is an isometric view of a liquid container illustrating how the pressure contribution of successive layers of liquid in the container can be added to determine the total height of liquid.

A trapezoidal-shaped fuel tank is shown at reference numeral 10 in FIG. 1. Fuel tank 10 includes an upward sloping bottom 12 and vertical sides 14 and 16. A quantity of fuel 18 partially fills fuel tank 10 to a level 20 and is divided into layers or slices 22a-22d at equal intervals along vertical side 14, with a fractional height top layer 22e. The top surfaces of layers 22 are parallel to each other, and one side is defined by a segment of bottom 12. Each layer 22 contributes an incremental pressure to the total pressure of the quantity of fuel 18 within tank 10, measured at the lowest portion within the tank, i.e., adjacent the vertex of vertical side 14 and bottom 12. For cylindrical tank 30 shown in FIG. 2, the mass of liquid 32 within the tank is simply equal to the sum of the mass contributions for each of n layers having an equal area ($AREA_n$), where the contribution to pressure for each layer ($PRESSURE_n$) is known, divided by the gravitational acceleration acting on the fuel mass (GRAVITY), as shown in the equation represented at reference numeral 50. With respect to tank 10, the relative shape of each layer 22 must also be taken into consideration, and if tank 10 is installed on an aircraft—for example, as a wing tank—each of the corrections for parameters 40 shown in FIG. 2 must also be applied in determining the total volume and mass as a function of pressure. Details of a system and method for determining the volume and mass of fuel within an aircraft tank are disclosed below.

Figure 3:
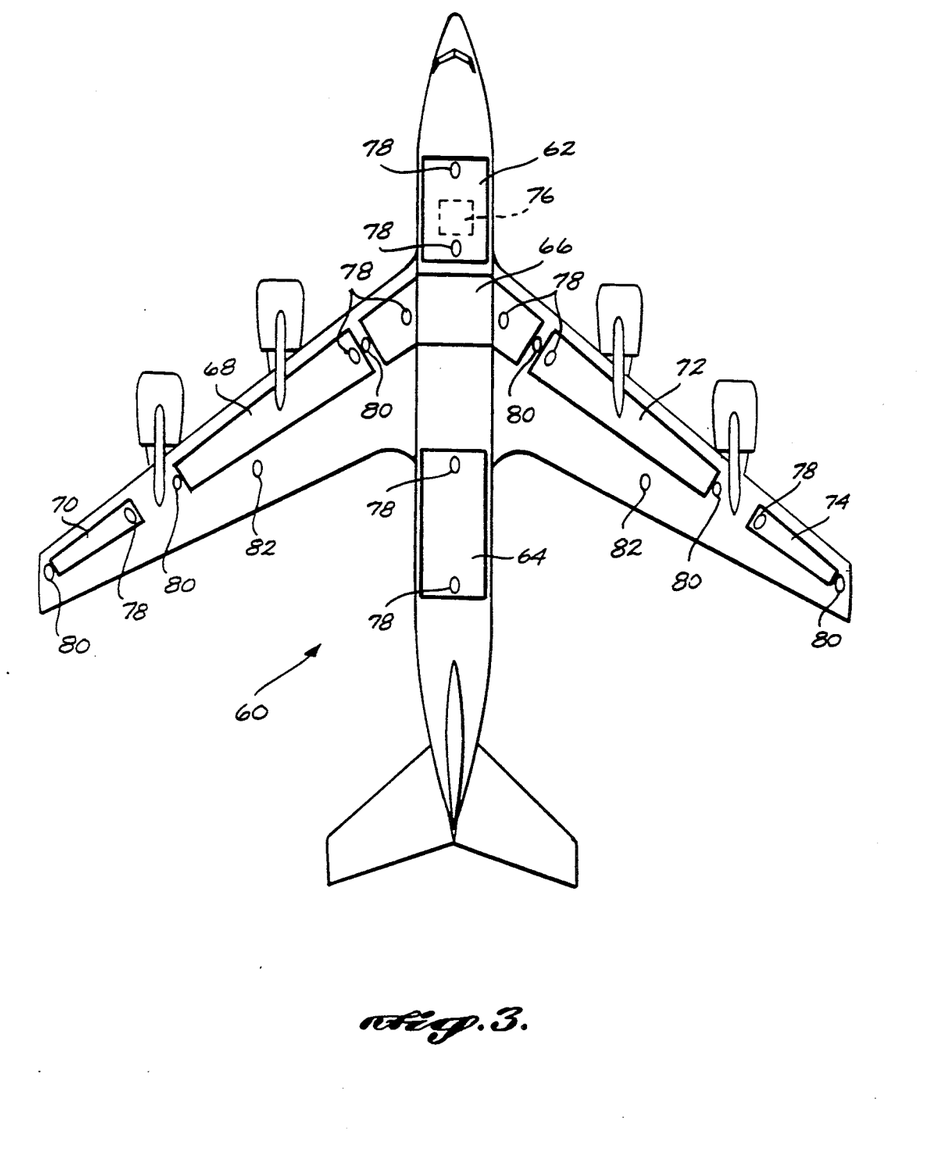
FIG. 3 is a plan view of an aircraft in outline showing the disposition of fuel tanks within the wings and main body.

Turning now to FIG. 3, an aircraft 60 is shown in outline in order to show the disposition of a plurality of onboard fuel tanks. The location of fuel tanks in each different aircraft design may vary significantly and may differ in number from those shown for aircraft 60. The fuel tank arrangement shown for aircraft 60 is merely representative of one such arrangement; it includes a forward body tank 62, disposed under the floor of the cabin, and an aft body tank 64, also disposed under the cabin floor. In addition, a central body tank 66 is disposed between the forward and aft body tanks and extends outward from the body into the wings. The left wing of the aircraft includes a main wing tank 68 and a wing tip tank 70. Similarly, the right wing includes a main wing tank 72 and a wing tip tank 74. An instrumentation module 76 disposed above the forward body tank, in an instrumentation bay of the aircraft, is operative to process signals produced by a plurality of sensors onboard the aircraft to determine the volume and mass of fuel in each of the individual fuel tanks and the total volume and mass of fuel onboard the aircraft.

To determine the fuel quantity, pressure sensors 78 are disposed in the bottom of each of the tanks, proximate the lowest point. Forward body tank 62 and aft body tank 64 each include two pressure sensors 78, since in level flight, the bottoms of each of the forward and aft tanks may be approximately level but do not include a single lower point in which the fuel will collect as the aircraft changes pitch. Each of the wing tanks 68, 70, 72, and 74, and central body tank 66 includes high fuel level sensors 80 disposed at its upper end, to determine when the tank is full of fuel in order to cutoff the flow of fuel into the tank during refueling operations. Wing bending sensors 82 are disposed in the left and right wings to measure the deflection of the wing due to static and dynamic forces acting on the wing that affect the disposition of the wing fuel tanks.

A typical main wing fuel tank 100 is shown schematically in FIG. 4, in a phantom view in which the outer surfaces of the wing tank are outlined, to disclose the "plumbing" that extends through the interior of wing tank 100. Wing tank 100 includes a plurality of baffles 102 interposed transversely to its longitudinal dimension. Baffles 102 include check valves (not shown) adjacent the bottom of the tank through which the fuel contained within wing tank 100 may flow freely toward its inboard end (end closest the aircraft fuselage). The purpose of baffles 102 is to minimize the sloshing of fuel back and forth within the tank during aircraft maneuvers.

A fuel fill manifold line 104 extends longitudinally through wing tank 100, in fluid communication with a wing tip tank and an inboard body tank (not shown in FIG. 4). Fuel is pumped into wing tank 100 through fuel fill manifold line 104 until a fuel level control valve 106 shuts off the flow of fuel when the tank is full. In the event that fuel level control valve 106 fails, the high fuel level sensor 80 (not shown in FIG. 4) acts as an override to terminate the inflow of fuel into wing tank 100.

An aft boost pump 108 and a forward boost pump 110 are disposed inside wing tank 100, adjacent its inboard end. Aft boost pump 108 and forward boost pump 110 pump fuel from wing tank 100 respectively through a fuel line 112 and a fuel line 114 to a dual checkvalve 116. Engine feed fuel lines 118, 120, and 122 carry fuel from dual checkvalve 116 to wing mounted engines (not shown) and interconnect wing tank 100 with other adjacent fuel tanks. A pressure sensor assembly 124 is disposed between aft boost pump 108 and forward boost pump 110, at the bottom of wing tank 100, and a temperature probe 126 extends vertically upward through the fuel enclosed within wing tank 100 from the top of pressure sensor assembly 124.

Figure 5:
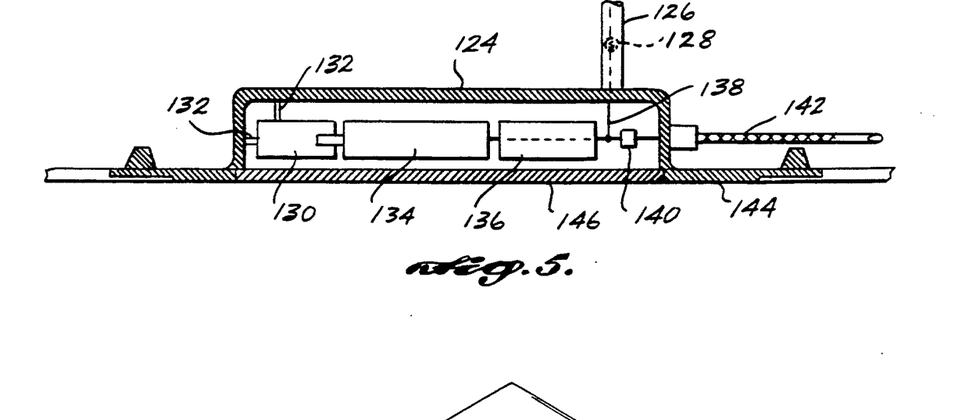
FIG. 5 is a cut-away view of a portion of the pressure sensor module provided in the bottom of a fuel tank in the present invention.

Pressure sensor assembly 124 and other components of the fuel quantity measurement system that may require maintenance or replacement are installed in each of the fuel tanks within a fully accessible enclosure so that maintenance may be performed on the components without draining the fuel tank. A preferred embodiment of pressure sensor assembly 124 is shown in FIG. 5, illustrating the manner in which the pressure sensor components are sealed apart from the fuel wetted volume of the wing tank. A valve 130 in the pressure sensor assembly is connected to two inlets 132 that convey the fluid pressure of the fuel above the inlets to a pressure transducer 134. The signal produced by pressure transducer 134 is indicative of fluid pressure due to the weight of fuel above pressure sensor assembly 124. Leads 138 also connect to temperature probe 126.

In the preferred embodiment, temperature probe 126 includes six temperature sensors at spaced apart intervals between the top of pressure sensor assembly 124 and the top of wing tank 100. Each temperature sensor 128 determines the temperature of the fuel within wing tank 100 at the height above the bottom of the tank at which the temperature sensor is disposed. The signals produced by each of the temperature sensors 128 and by pressure transducer 134 are conveyed through leads 138 to a connector 140 for attachment to a flexible fuel-proof conduit 142 that extends to the instrumentation module 76, shown in FIG. 3.

Pressure sensor assembly 124 is easily retrofitted to an existing wing fuel tank installation, since it is sized to replace a sealed hatch cover for an access port in the tank. Accordingly, pressure sensor assembly 124 provides a dry bay integrally formed in an access port fitting 144, which is sealed around its periphery and is installed over the access port in the underside of wing tank 100. An access bay cover 146 is fastened in place to enclose the lower portion of pressure sensor assembly 124, but it is freely removable for replacement of pressure transducer 134 or temperature sensors 128. An over center installation clip 136 comprises a snap-in device for providing a biasing force that holds pressure transducer 134 in sealing engagement with valve 130, permitting it to be rapidly released for replacement. Valve 130 blocks fuel flow from wing tank 100 when pressure transducer 134 is removed.

A dynamic attitude sensor is shown generally at reference numeral 150. Attitude sensor 150 is used for determining the pitch, roll, and acceleration of the aircraft with respect to its own reference axes to compensate for the effect of dynamic forces on the fuel within each of the fuel tanks on the aircraft. Attitude sensor 150 is preferably disposed within instrumentation module 76 or at some other central location and is fixed to the structure or frame of the airplane. In the exploded view in FIG. 6, a cover 152 is displaced to expose the internal components of attitude sensor 150. Cover 152 is normally attached to a base 154. A roll sensor 156 is attached by a bracket 158 to base 154 and preferably comprises an inclinometer that produces a signal corresponding to the deviation from a vertical reference axis about a longitudinal axis of aircraft 60. Similarly, a pitch sensor 160 is connected to base 154 with a bracket 162 and comprises an inclinometer sensitive to any variation from the vertical reference about a transverse axis extending orthogonally to the longitudinal axis of the aircraft. Brackets 158 and 162 are connected to base 154 at a right angle with respect to each other so that the inclinations determined by roll sensor 156 and pitch sensor 160 are in orthogonal relationship to each other and to the planar surface of base 154.

Figure 6:
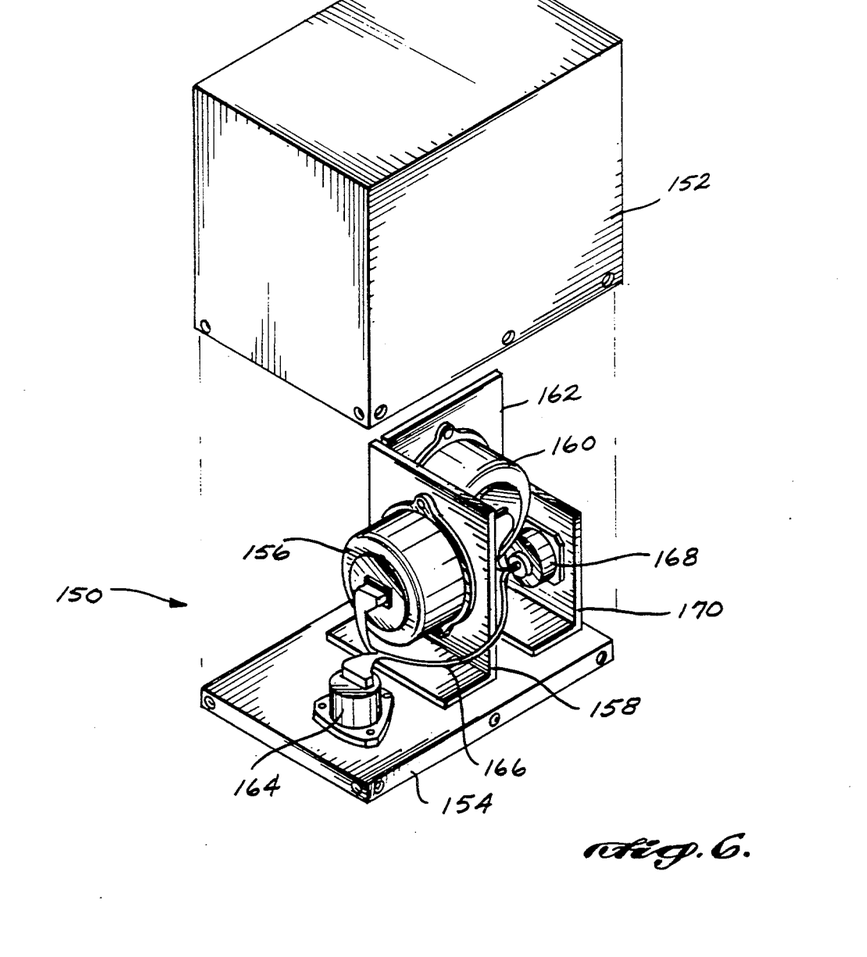
FIG. 6 is an exploded view of an attitude sensor illustrating the inclinometers and accelerometer used to determine the attitude of the liquid surface in a fuel tank.

In addition, attitude sensor 150 includes an accelerometer 164, also mounted to base 154 so that its acceleration-sensitive axis is perpendicular thereto. Accelerometer 164 is therefore operative to determine the acceleration to which the aircraft is subjected in a direction normal to base 154. Since base 154 is mounted in a fixed relationship with respect to the airframe of aircraft 60, the signal produced by accelerometer 164 serves as an indication of the component of acceleration acting on the fuel in each of the fuel tanks of the aircraft with respect to the vertical reference axis of aircraft 60. Roll sensor 156 and pitch sensor 160 define the deviation of the aircraft attitude with respect to the acceleration-sensitive axis, i.e., with respect to the vertical reference axis of aircraft 60. The signals produced by roll sensor 156, pitch sensor 160, and accelerometer 164 are conveyed through a cable 166 to a connector 168, which is mounted to base 154 in a bracket 170. Connector 168 is attached to a cable (not shown) that carries the signals to instrumentation module 76.

Wing bending sensors 82 preferably comprise inclinometers (similar to the roll sensor and pitch sensor used in attitude sensor 150), which are mounted to a spar in the wing so that they are aligned with the reference axis of the aircraft during initial installation, when the wing fuel tanks are empty. As the wing tanks are filled with fuel, its weight causes the wing to deflect downwardly. During flight, the aerodynamic lift of the wing and other forces acting on the wing change its deflection angle. Wing bending sensors 82 thus determine the effect of wing bending on the fuel surface in the wing tanks.

Figure 8:
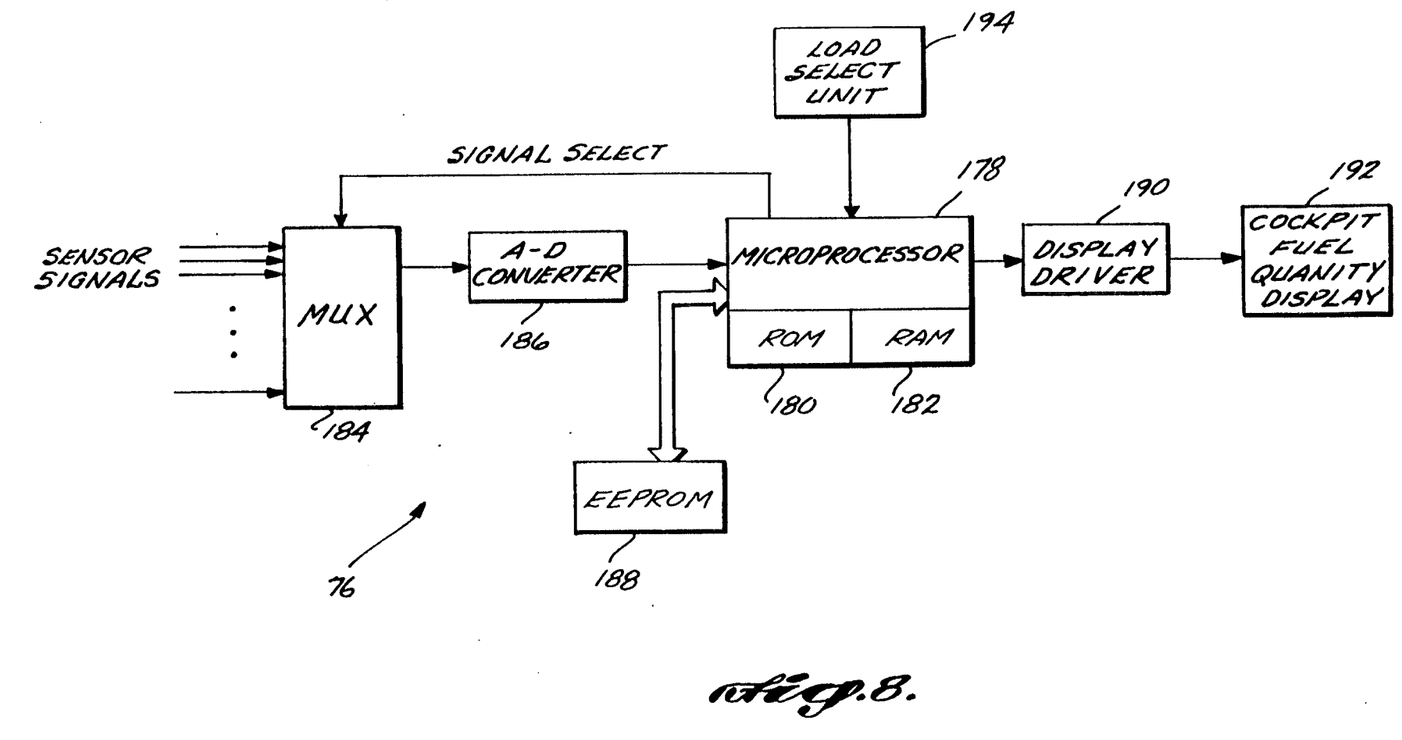
FIG. 8 is a block diagram of an instrumentation module for determining fuel quantity.

Signals produced by the various pressure sensors 78, wing bending sensors 82, attitude sensors 150, and temperature sensors 128 for all fuel tanks on the aircraft are input to instrumentation module 76. Preferably, as shown in FIG. 8, instrumentation module 76 comprises a microprocessor 178, including a read only memory (ROM) 180, in which is stored a program for carrying out the method of the present invention, and a random access memory (RAM) 182, providing temporary storage of variables during program implementation. Signals from each of the above-named sensors are input to a multiplexer 184 in instrumentation module 76 and are thus selected for analog-to-digital conversion by an A-D converter 186. Alternatively, digital signals from each sensor may be conveyed over a Datac bus (not shown) or any alternate digital data bus and input to microprocessor 178 through a data interface (also not shown).

Figure 7:
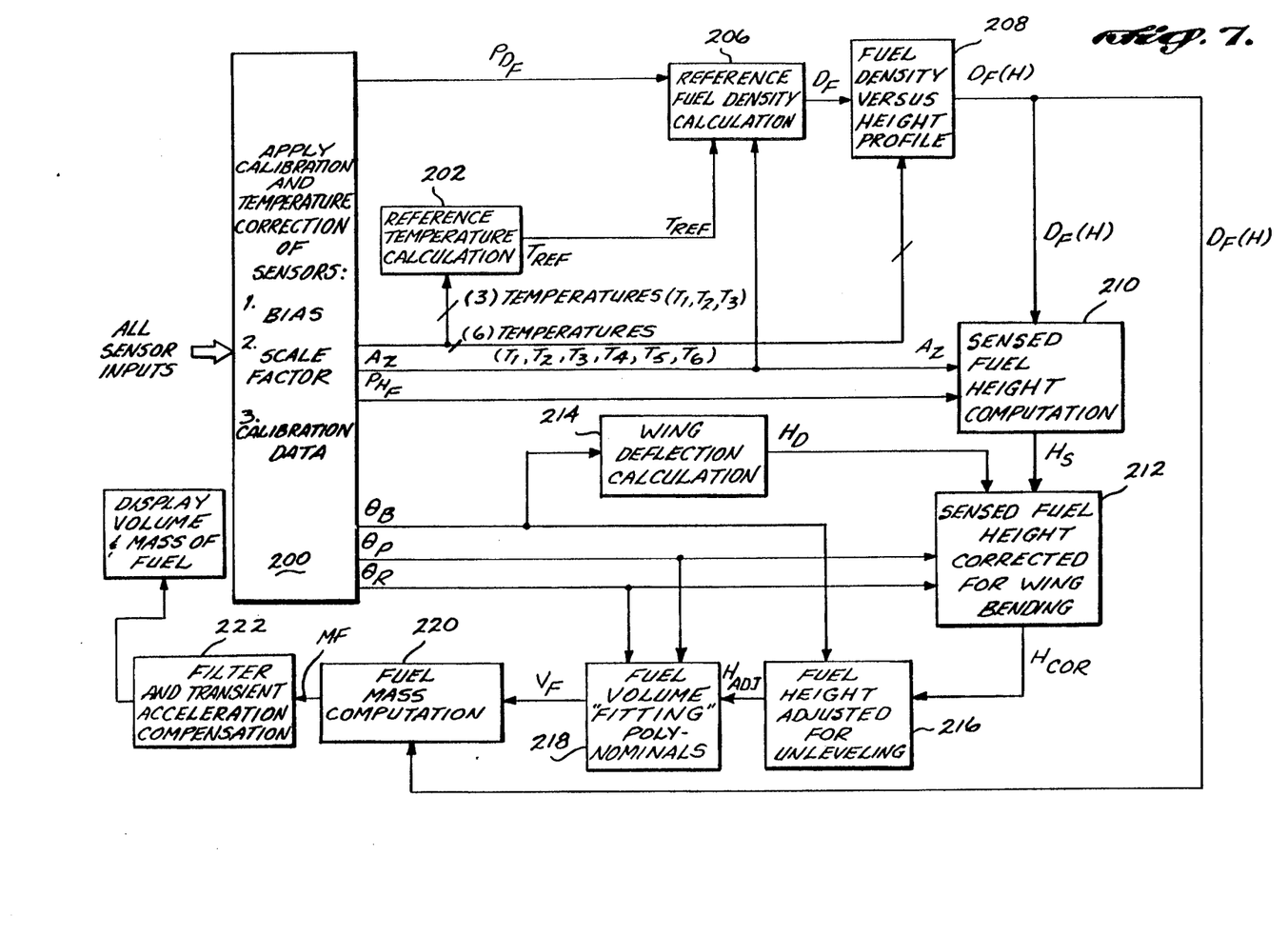
FIG. 7 is a block diagram illustrating the logic implemented by the liquid quantity measurement system of the present invention in computing the volume and mass of fuel in a tank.

FIG. 7 illustrates the algorithm implemented by microprocessor 178 in determining the quantity of fuel in each tank and the total quantity of fuel onboard the aircraft, both with respect to volume and mass. In a block 200, calibration factors and temperature corrections are applied to the signals produced by all sensors providing an input signal to the microcomputer. The calibration factors and temperature corrections are based upon coefficients supplied by the manufacturer of each sensor or determined after the fuel quantity measurement system is installed, and include bias, scale factor, and offset data. The correction factors and calibration data for each of the sensors are stored in an electronic erasable programmable read only memory (EEPROM) 188. It should be understood that the algorithm shown in block format in FIG. 7 is applied to determine the fuel quantity in each fuel tank on aircraft 60, but for purposes of simplification, the algorithm is explained below only with respect to main wing fuel tank 100.

The temperature of the fuel in main wing fuel tank 100 is determined by each temperature sensor 128 at the six different elevational levels on temperature probe 126. The six temperatures determined by temperature sensors 128 are identified in FIG. 7 by $T_1$ through $T_6$. The three temperatures, $T_1$, $T_2$, and $T_3$, from the lowest three temperature sensors 128, are input to a block 202 for calculation of a reference temperature ($T_{REF}$). The reference temperature is simply the average of temperatures $T_1$ through $T_3$. The value of $T_{REF}$ is input to a block 206 for determination of the reference fuel density ($D_F$). The value for $D_F$ can be measured with a fuel density transducer (not shown), which determines the differential pressure ($P_{DF}$) proportional to the weight of a column of fuel extending between the height of the temperature sensors 128 that produce the $T_1$ and $T_3$ temperatures. The reference fuel density is then derived using the equation:

$$D_F = P_{DF}/A_Z L \tag{7}$$

where:
- $P_{DF}$ = the sensed differential pressure (pressure at the height of the temperature sensor providing $T_1$ minus the pressure at the height of the temperature sensor producing $T_3$);
- $A_Z$ = acceleration along the vertical reference axis of aircraft 60 (measured by accelerometer 164), which is parallel to the fuel density transducer; and
- L = the distance between the upper and lower pressure sensors of the fuel density transducer.

In the preferred embodiment, a fuel density transducer is not included, but instead, a value for reference fuel density is predefined as a function of temperature for the fuel loaded on aircraft 60. The above equation is presented to define the manner in which the reference fuel density may be determined using a fuel density transducer. The reference fuel density ($D_F$) is supplied to a block 208 that determines the fuel density versus height profile as a function of the six temperatures $T_1$ through $T_6$. In determining the fuel density versus height profile, the density of the fuel at the height of ith temperature sensor 128, defined as $H_i$, is determined from the following equation:

$$D_F(H_i) = D_F(T_{REF}) \times (1 + A_1 T + A_2 T^2 + A_3 T^3) \tag{8}$$

where:
- $T = T_i - T_{REF}$;
- $D_F(H_i)$ = the fuel density at temperature sensor i;
- $D_F(T_{REF})$ = the calculated reference fuel density at $T_{REF}$;
- $A_1$, $A_2$, $A_3$ = predetermined constants; and
- $T_i$ = the temperature at temperature sensor i.

Once the density is calculated at each of the six temperature sensors on temperature probe 126, a Lagrange fitting technique is used to determine the density profile of the tank, expressed as $D_F(H)$. The density profile is input to a block 210 for computing sensed fuel height ($H_S$). In addition, the acceleration along the reference Z axis of the aircraft and the pressure determined by pressure transducer 134 ($P_{HF}$) are input to block 210, since the sensed fuel height computation depends upon the acceleration to which the fuel is subject and the pressure at the bottom of the tank. It should be understood that the fuel height pressure ($P_{HF}$) represents the pressure due to the weight of the fuel in the tank above the fuel sensor and does not include the air pressure above the surface of the fuel in the tank. To determine $P_{HF}$, it is preferable to use a differential pressure transducer for pressure transducer 134 to minimize percent of full scale error; alternatively, the air pressure above the fuel surface inside the tank is monitored by sensors (not shown) and subtracted from the total pressure signal produced by pressure transducer 134. Care must be taken that pressure measured is the true pressure above the fuel surface and not merely ambient static air pressure, since the tanks are slightly pressurized by dynamic in-flight or ram air effects.

The procedure used to compute sensed fuel height ($H_S$) includes the step of adding the pressure contribution of successive layers of fuel, derived from the fuel density versus height profile, over a succession of incremental heights until the total ($P_{SUM}$) is greater than the sensed fuel height pressure ($P_{HF}$). The fuel height is determined to be the sum of the height intervals plus the fractional interval used in place of the last interval that caused the sensed fuel height pressure to be exceeded. The fractional height interval is computed by dividing the difference between the sensed pressure ($P_{HF}$) and $P_{SUM-1}$ by the value ($A_Z$), the acceleration along the aircraft vertical reference axis, and by the density for the last height interval. Incremental pressures and height are calculated based upon the following equations:

$$P_i = A_Z[D_F(H_{i-1}) + D_F(H_i)]/2 \times H_{DELTA} \tag{9}$$

$$P_{SUM} = \sum_{i=1}^{N-1} P_i \tag{10}$$

$$H_S = (N-1)H_{DELTA} + (P_{HF} - P_{SUM})/[A_Z D_F(H_{N-1})] \tag{11}$$

where:
- $P_i$ = incremental pressure for height $H_i$;
- $H_{DELTA}$ = constant incremental height; and
- N = number of iterations until $P_{SUM} > P_{HF}$.

Sensed fuel height ($H_S$) is input to a block 212 for correction of fuel height due to wing bending. The angle of deflection ($\theta_B$) is input to a block 214 from temperature correction block 200. In block 214, a wing deflection height correction ($H_D$) is determined based upon the following equation:

$$H_D = B_1 \theta_B + B_2 \theta_B^2 + B_3 \theta_B^2 \tag{12}$$

where:
- $B_1$, $B_2$, and $B_3$ = coefficients determined from wing deflection and in-flight calibration data, which are stored in EEPROM 188 for use by microprocessor 178 to determine fuel quantity.

The value for $H_D$ is input to block 212. In addition, signals indicative of fluid surface angle ($\theta_P$) and roll angle ($\theta_R$) relative to the reference axes used for pressure are input to block 212 to determine compensation for acceleration forces acting on the fuel in the aircraft as well as the wing deflection correction. In block 212, a corrected fuel height ($H_{COR}$) is determined according to the following equation:

$$H_{COR} = A_0 + A_1\theta_P + A_2\theta_P\theta_R + A_3\theta_P\theta_R H_D + A_4\theta_P\theta_R H_D H_S + \ldots + A_{81}\theta_P^2\theta_R^2 H_D^2 H_S^2 \quad (13)$$

where $A_i$ = constants determined from wing deflection and calibration data stored in EEPROM 188.

The value for corrected fuel height ($H_{COR}$) is input to a block 216 for evaluation of fuel height/unleveling constraints. Unleveling in the fuel tanks occurs due to the limitation on free fuel flow in the tank created by baffles 102 and is particularly relevant at low fuel levels during large positive changes in pitch of the aircraft. Under these conditions, the uncorrected fuel volume and mass estimates erroneously increase. Accordingly, unleveling conditions must be corrected in the event that the change in pitch is positive and exceeds a predetermined rate, preferably 10° per minute, but only if the fuel mass is observed to increase. When the preceding conditions are met, block 216 prevents averaging of new fuel quantities. Instead, microprocessor 178 produces a signal that is input to a display driver 190 (see FIG. 8), causing a cockpit fuel quantity display 192 to indicate the last valid fuel quantity. Furthermore, on a continuing basis, microprocessor 178 reduces the displayed quantity of fuel as a function of known fuel consumption. When the plane levels off, fuel begins to flow more freely within wing tank 100 until it reaches a normal level condition within the lower portion of the tank. Once the fuel level has equalized, the estimated value of fuel quantity in the tank is replaced with a more accurate calculated value as the system returns to its normal fuel measuring status.

The fuel height adjusted for unleveling ($H_{ADJ}$) is input to a block 218, along with $\theta_P$ and $\theta_R$, the pitch and roll angle values. In block 218, fuel volume is determined from the general equation:

$$V_i(\theta_P,\theta_R,H_{ADJ}) = K_i(0) + K_i(1)\theta_P + K_i(2)\theta_P\theta_R + K_i(3)\theta_P\theta_R H_{ADJ} + \ldots + K_i(35)\theta_P^2\theta_R^2 H_{ADJ}^3 \quad (14)$$

where:

$V_i$ = fuel volume as a function of a particular pitch, roll, and height range (where subscript i indicates which equation of a set is being used); and $K_i$ = constants determined from calibration data for each volume equation in the set.

The above equation takes into account structural tank geometry, including dry bays and the volume occupied by fuel pumps and pipes, and other component installations. The volume is determined in real time by selecting from a set of (i) groups of polynomial coefficients (K(i)) stored in EEPROM 188, a single group of polynomial coefficients ($K_i(j)$) that models the fuel volume as a function of roll and pitch angle and adjusted height over a selected range. The resulting volume calculation produces a value ($V_F$) which is used to compute fuel mass within the tank.

The value $V_F$ is input to a block 220 for determination of fuel mass, based upon incremental fuel volumes and the density profile ($D_F(H)$). Incremental mass sections for given heights within the fuel tank are computed by multiplying the corresponding incremental volume sections and densities. The total fuel mass ($M_F$) is determined by totaling each of these incremental mass sections (and the top partial section) in accordance with the equation:

$$M_F = D_F(H_{n-1}) \times [V_F(H_{LAST}) - V_F(H_{n-1})] + \sum_{i=1}^{N-1}[D_F(H_{i-1}) + D_F(H_i)]/2 \times [V_F(H_i) - V_F(H_{i-1})] \quad (15)$$

where:

$H_{LAST}$ = last incremental layer of fuel height ($H_S - H_{n-1}$); and $H_{n-1}$ = value of fuel height such that $H_n > H_S$.

The result of the above calculation is an unfiltered fuel mass value ($M_F$), which is input to a filter and transient acceleration compensation block 222. Successive values of $M_F$ are filtered by integration over a variable time interval. For example, when the plane is parked on the ground, a typical filter time constant for integrating the values ($M_F$) is 15 seconds, which is equivalent to the time required to produce 120 samples. During flight, the time constant for the filtering algorithm is selected as a function of an acceleration index ($A_{INDEX}$) that is based upon the rate of change of the measured value for $A_Z$. For intermediate values of vertical acceleration, the acceleration index ranges between 0.05 and 0.1 feet per second², and a filter time constant of 45 seconds is used, corresponding to the time required to produce 360 samples. Under extreme vertical acceleration, the acceleration index is greater than 0.1 feet per second², and a filter time constant of 60 seconds is used, corresponding to 480 samples. The filter time constants noted above are determined by the following equation in the preferred embodiment; however, it will be understood that the filter time constants may be selected by a different equation, depending upon flight test data for a given aircraft configuration:

$$A_{INDEX} = (1/40)\sum_{i=1}^{40}|a_{i-1} - a_i| \quad (16)$$

where:

$a_i = A_z$ acceleration value for ith sample.

The filtered mass of fuel and volume of fuel is displayed in the aircraft on the cockpit fuel quantity display 192 for each of fuel tanks 62, 64, 66, 68, 70, 72, and 74, along with the total mass and volume of fuel on board the aircraft. In addition to providing the driving signal display driver 190 to indicate the quantity of fuel onboard the aircraft, microprocessor 178 is used to control the amount of fuel loaded onboard the aircraft within each tank by closing fueling valves into each of the respective tanks when a predetermined quantity of fuel has been added. In accomplishing this task, microprocessor 178 works with a load select unit (LSU) 194, which permits the operator to select a quantity for automatic fueling in any of the fuel tanks and continuously displays the quantity of fuel in each tank on cockpit fuel quantity display 192.

While the present invention has been disclosed with respect to its application to measuring the quantity of fuel in an aircraft fuel tank, it should be understood that it is equally applicable for measuring the quantity of any liquid within any container. Further modifications to the preferred embodiment within the scope of the claims that follow will be apparent to those of ordinary skill in the art. Accordingly, it is not intended that the scope of the invention be in any way limited by the disclosure of the preferred embodiment, but instead that the scope be determined entirely by reference to the claims.

The embodiments of the invention in which an exclusive property or privilege is claimed are defined as follows:

1. A system for determining a quantity of a liquid within a container, said container having a shape, said liquid having as a property a pressure, a volume, a temperature, a height, a mass, and a surface, said surface having an orientation, the system comprising:
   (a) a pressure sensor disposed proximate a lower portion of the container, said pressure sensor producing a signal indicative of the pressure of the liquid at the pressure sensor;
   (b) a plurality of temperature sensors disposed at a plurality of different elevations within the liquid, each temperature sensor producing a signal indicative of the temperature of the liquid at the elevation of that temperature sensor; and
   (c) processor means, connected to receive the signals produced by the pressure sensor and the temperature sensors, for determining:
      (i) a density profile for the liquid, defining its density at different elevations in the container as a function of a reference density of the liquid and of the temperature of the liquid at the temperature sensors;
      (ii) the height of the liquid in the container as a function of the density profile and the pressure of the liquid; and
      (iii) the quantity of liquid in the container as a function of its height and of parameters modeling the shape of the container.

2. The system of claim 1, wherein the processor means determines the volume of the liquid in the container as a measure of its quantity.

3. The system of claim 1, wherein the processor means determines the mass of the liquid in the container as a measure of its quantity.

4. The system of claim 1, further comprising accelerometer means for determining a component of an acceleration to which the liquid is subjected, said component being aligned with a reference axis.

5. The system of claim 4, wherein the processor means compensates the signal produced by the pressure sensor for the component of acceleration to determine the height of the liquid.

6. The system of claim 4, wherein the accelerometer means includes inclinometer means for determining an angle between the acceleration to which the liquid is subjected and the reference axis, so that the orientation of the surface of the liquid is defined with respect to the reference axis.

7. The system of claim 1, wherein the container comprises an aircraft wing fuel tank and the liquid comprises fuel.

8. The system of claim 7, further comprising means for sensing a deflection of the aircraft wing fuel tank, said processor means compensating the height of the fuel for the deflection of the aircraft wing fuel tank in response to a signal produced by said means for sensing deflection.

9. The system of claim 1, wherein the parameters modeling the shape of the container comprise a set of polynomial coefficients that define a volume-height relationship of a plurality of parallel sections taken through the container.

10. A system for sensing a quantity of fuel in an aircraft fuel tank, said fuel tank having a shape, said fuel having as a property a pressure, a temperature, and a height, the system comprising:
    (a) a pressure sensor disposed proximate the bottom of the fuel tank, said pressure sensor producing a signal indicative of the pressure of the fuel above the pressure sensor;
    (b) accelerometer means for determining a component of an acceleration to which the fuel is subjected and producing a signal indicative thereof, said component being aligned with a reference axis;
    (c) means for determining a fuel density profile within the fuel tank; and
    (d) processor means, connected to receive the signals produced by the pressure sensor and by the accelerometer means, for determining the height of the fuel in the tank as a function of both the pressure of the fuel in the tank and the component of acceleration, said processor means correcting the height of the fuel for variations in fuel density at different elevations above the pressure sensor and determining the quantity of fuel in the tank as a function of its height and of a plurality of parameters that model the shape of the fuel tank.

11. The system of claim 10, wherein the processor means determines the quantity of fuel by determining its volume and its mass.

12. The system of claim 10, wherein the means for determining the fuel density profile comprises a plurality of temperature sensors disposed at different elevations within the fuel, which produce temperature signals indicative of the temperature of the fuel at the different elevations, said processor means determining the density profile as a function of said temperature signals and of a reference density for the fuel.

13. The system of claim 10, wherein the accelerometer means includes:
    (a) inclinometer means for determining a first and a second inclination angle between the reference axis and the acceleration to which the fuel is subjected, said first and second inclination angles corresponding to a roll and a pitch of an aircraft in which the fuel tank is disposed; and
    (b) an accelerometer having an acceleration sensitive axis aligned with the reference axis, said first and second inclination angles determining a correction to be applied to a signal from the accelerometer by the procesor means, to determine fuel height.

14. The system of claim 10, wherein the fuel tank is disposed in an aircraft wing, further comprising deflection means for determining the deflection of the wing and producing a signal indicative of said deflection, said processor means correcting the height of the fuel for the wing deflection as a function of said signal indicative of said deflection.

15. The system of claim 10, wherein the processor means includes memory means for storing data and wherein said fuel tank is geometrically modeled by the processor means using a set of calibration polynomial coefficients comprising the parameters, which are stored in the memory means.

16. The system of claim 10, wherein the accelerometer means senses both local gravity and inertial acceleration.

17. A method for determining a quantity of a liquid in a container, said container having a shape, said liquid having as a property a pressure, a volume, a temperature, a height, a mass and a surface, the method comprising the steps of:
(a) sensing the pressure of the liquid at a point proximate a lower portion of the container;
(b) sensing a component of acceleration to which the liquid is subjected, said component being aligned with a reference axis;
(c) determining the height of the liquid in the container as a function of the pressure and of the component of acceleration;
(d) determining a liquid density profile within the container;
(e) correcting the height of the liquid for variations in the liquid density; and
(f) determining the quantity of the liquid in the container as a function of its height as corrected and of a plurality of parameters that model the shape of the container.

18. The method of claim 17, wherein the step of determining the quantity of liquid includes the steps of determining the volume of the liquid, and determining the mass of the liquid in the container.

19. The method of claim 17, wherein the step of determining the density profile includes the steps of sensing the temperature of the liquid at a plurality of different elevations within the container, and determining the density of the liquid at each of the elevations.

20. The method of claim 19, wherein the step of determining the density profile further comprises the step of using a Lagrange curve fitting technique to fit the density of the liquid at the different elevations to the density profile.

21. The method of claim 17, wherein the step of determining the fuel height comprises the steps of summing an incremental pressure contribution from each of a plurality of liquid layers of equal incremental height, until the sum of the pressure contributions is approximately the same as the sensed pressure of the liquid, and summing the incremental heights of the layers thus contributing to the pressure to determine the height of the liquid.

22. The method of claim 21, wherein the incremental pressure contribution from each liquid layer is compensated for the component of the acceleration acting on the liquid.

23. The method of claim 17, wherein the container comprises an aircraft wing fuel tank and the liquid comprises fuel.

24. The method of claim 23, further comprising the step of sensing a deflection of the aircraft wing fuel tank and compensating for the deflection in determining the height of the fuel in the tank.

25. The method of claim 17, wherein the step of sensing a component of acceleration comprises the steps of sensing acceleration along the reference axis and sensing an inclination angle between the reference axis and the acceleration to which the liquid is subjected, said inclination angle determining the orientation of the surface of the liquid with respect to the reference axis.

26. The method of claim 25, wherein the step of determining the quantity of fuel in the tank comprises the step of selecting a group of polynomial coefficients for an equation defining a volume of liquid in the container from a plurality of groups of said polynomial coefficients in an available set of such groups, as a function of the height of the liquid and orientation of the liquid surface in the container.

* * * * *